INVENTOR.
THOMAS G. OWEN JR.
BY
Woodard, Weikart, Emhardt & Naughton
ATTORNEYS

Dec. 15, 1970    T. G. OWEN, JR    3,546,859
COTTON PICKER
Filed Jan. 27, 1969    2 Sheets-Sheet 2
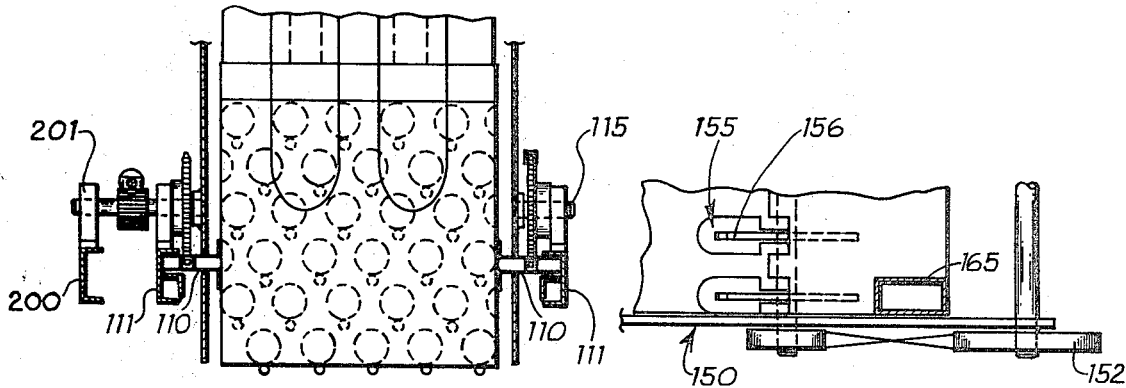
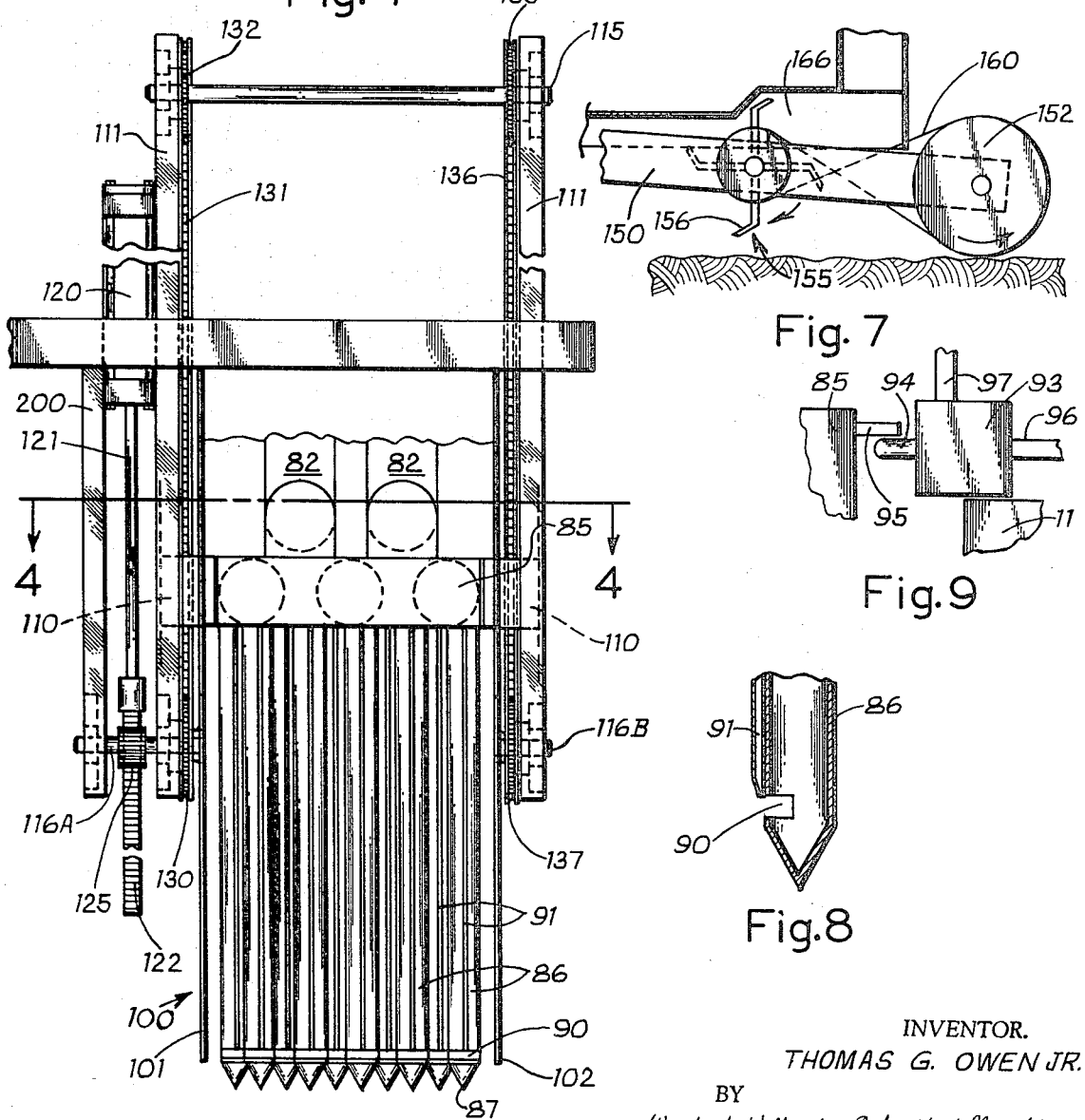
INVENTOR.
THOMAS G. OWEN JR.
BY
Woodard, Weikart, Emhardt & Naughton
ATTORNEYS ously reciprocate. Fixedly
United States Patent Office 3,546,859
Patented Dec. 15, 1970

3,546,859
COTTON PICKER
Thomas G. Owen, Jr., 5126 W. 16th St.,
Speedway, Ind. 46224
Filed Jan. 27, 1969, Ser. No. 794,324
Int. Cl. A01d 45/20
U.S. Cl. 56—12                                    10 Claims

ABSTRACT OF THE DISCLOSURE

Cotton picking apparatus including a vehicle having a plurality of parallel hollow vacuum containing pipes mounted thereon. Each of the pipes is pointed on its lower end and each has a slot adjacent its lower end. A blower is coupled to the pipes so as to produce a vacuum therein and move cotton into the pipes thence to a receptacle. The pipes are vertically reciprocated by a hydraulic motor.

BACKGROUND OF THE INVENTION

Field of the invention

This invention relates to a cotton picking apparatus.

Description of the prior art

There are a number of various types of cotton pickers disclosed in the prior art. Most cotton pickers, however, do not use the vacuum principle to suck the cotton into a receptacle. Some of the prior patents which do show the use of vacuum are the U.S. patent to Lofgreen 3,332,-220, the U.S. patent to Graham 2,763,978, the U.S. patent to Luhn 2,204,092 and the U.S. patent to Space 2,680,-338. For various reasons these prior art devices have not proven to be entirely satisfactory.

SUMMARY OF THE INVENTION

One embodiment of this invention might involve cotton picking apparatus comprising a vehicle, means for moving said vehicle across the ground, a pair of guide elements positioned at the front of the vehicle and adapted to maintain the cotton stalks in a generally upright position therebetween as the vehicle moves through the cotton, a plurality of vertically extending hollow pipes each having a forwardly facing slot therein adjacent to the lower end thereof, means for providing a vacuum in said pipes, each of said plurality being arranged in a pattern through which the cotton stalks move as the vehicle moves across the ground, and means for vertically reciprocating said pipes.

One object of this invention is to provide an improved cotton picker.

Related objects and advantages will appear as the description proceeds.

BRIEF DESCRIPTION OF THE DRAWING

The full nature of the invention will be understood from the accompanying drawings and the following description in claims:

FIG. 4 is a horizontal section taken along the line 4—4 of FIG. 5 in the direction of the arrows.

FIG. 5 is an enlarged front elevation of a portion of the structure illustrated in FIG. 3 with certain portions of the structure broken away for clarity.

FIG. 6 is a fragmentary plan view of a spillage pick up device forming a part of the present structure.

FIG. 7 is a side elevation of the structure illustrated in FIG. 6.

FIG. 8 is an enlarged vertical section taken through the axis of one of the pipes forming a part of the structure illustrated in, for example, FIG. 5.

FIG. 9 is a side elevation of a valve and associated structure all forming a part of the present preferred embodiment.

DESCRIPTION OF THE PREFERRED EMBODIMENT

Figure 1:
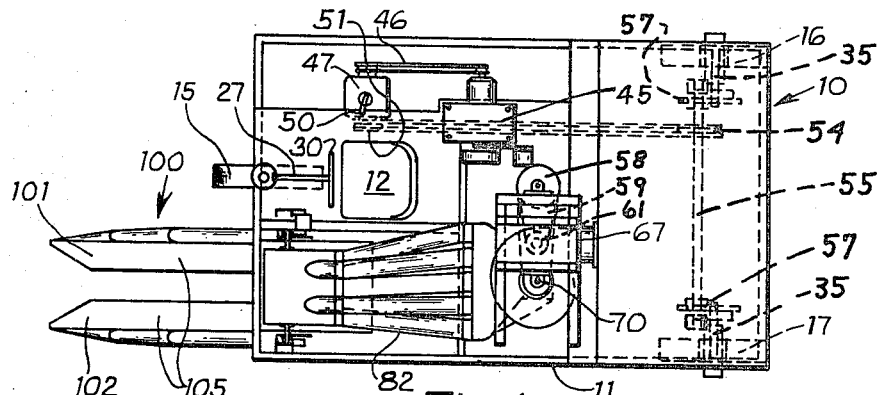
FIG. 1 is a top plan view of a cotton picking apparatus embodying the present invention.

Referring now more particularly to the drawing, there is illustrated a cotton picking apparatus 10 which includes a frame 11 having a seat 12 mounted thereon and having three wheels 15, 16 and 17. The front wheel 15 is mounted upon an axle 20 which is mounted in a fork 21 fixed to the lower end of the shaft 22. The upper end of the shaft 22 has fixed thereto a bevel gear 25 which meshes with a further bevel gear 26 fixed to a steering shaft 27 to the end of which is fixed a steering wheel 30 positioned in front of the seat 12. The rear wheels 16 and 17 are ratchet mounted on respective axles 35 to which are fixed sprockets 36 upon each of which is received in meshing relation a chain 37. The mounting of each of the wheels on its respective axle is such as to permit the outside wheel to move faster than its axle when the vehicle turns a corner. Each of the axles 35 is rotatably mounted on the frame 11. The steering shaft or post 27 is journaled within a suitable support member (not shown for clarity) which is fixed to the frame 11.

Power for the present device for movement from place to place is provided by a motor 45 which is coupled through suitable chain or belt drive 46 to the transmission 47. Transmission 47 is a standard gear shift operated type of transmission with the gear shifting lever 50 being easily accessible to the operator located at the seat 12. The output shaft of the transmission 47 has mounted thereon a sprocket 51 upon which chain 53 is received in meshing relation. The chain 53 also meshes with a sprocket 54 fixed to a shaft 55 rotatably mounted on the frame 11 by a pair of projections 56. The shaft 56 has fixedly mounted thereon a pair of sprockets 57 which drive the chains 37.

A blower 60 is driven through a belt and pulley coupling 59 from a constant speed motor 58. The belt and pulley coupling includes a clutch 61 and is arranged to drive input shaft 70 of the blower 60. The blower empties through its output 67 into a cotton receiving receptacle 80 fixedly mounted upon frame 11.

The input of the blower 60 is coupled to a manifold 81 which communicates with a plurality of flexible hoses 82 which connect to a vacuum chamber element or housing 85. The vacuum chamber 85 is vertically reciprocal and because of the coupling to the manifold 81 by the flexible hoses 82 is permitted to vertically reciprocate. Fixedly mounted to the vacuum chamber 85 and communicating therewith are a plurality of downwardly projecting hollow pipes 86. Each of the pipes has a pointed lower end 87 and a slot or opening 90 adjacent the lower end of the pipe. FIG. 8 shows a single one of the pipes 86 in axial section and also shows the slot 90 adjacent to the lower end of the pipe. Each of the pipes 86 has a relatively small diameter tube 91 which carries air under pressure and which exits or lets out it's pressurized air in a stream which passes across the slot 90 so as to blow away any accumulation of cotton at the slot 90 on each of the hollow pipes 86. The source of the air pressure is the blower 60 and cotton may be prevented from flowing through the tubes by a suitable filter. There is also provided a suitable valve 93 (FIG. 9) mounted on the frame 11 and having an actuating arm 94 which is operated by an arm 95 each time the vacuum chamber 85 to which it is fixed goes up and down. The valve 93 is on when the pipes are at the upper end of their stroke and off when the pipes are in the remainder of their stroke. The valve 93 controls flow of pressurized air through the hoses 96 and 97 which communicate between the source of air pressure at the blower and the tubes 91. Thus, the air pressure through the tubes 91 is provided in short spurts at the upper end of each stroke of the pipes.

Fixedly mounted so as to project and extend from the forward portion of the vehicle 10 is guide means 100. This guide means consist of a pair of elements 101 and 102 which have at their lower ends inwardly and horizontally extending portions 105. The inner edges of these inwardly horizontally extending portions 105 are spaced relatively closely to one another so as to compress the cotton stalks closely to one another and to guide them into the pattern formed by the plurality of pipes 86. It will be noted that in the front row of the plurality of pipes 86 there are five such pipes. In the second row of the plurality of pipes 86 there are again five such pipes but these additional pipes are spaced directly behind the spaces between the pipes in the first row. Thus, after the cotton stalks are passed through the compressed area caused by the horizontal portions 105, the cotton stalks move into pattern of pipes. In the present preferred embodiment of the invention there might be, for example, six rows of pipes so as to insure that all of the cotton is picked from the stalks.

As mentioned, the pipes 86 are mounted upon the vacuum chamber 85 and the vacuum chamber is vertically reciprocated. Fixed to the sides of the vacuum chamber 85 are a pair of vertically extending guides 110 which are received within vertically extending channels 111 fixed to the frame 11. Rotatably mounted upon suitable pillow blocks 112 on the channels 111 are shafts 115, 116A and 116B. The shaft 115 extends completely across the spacing between the channels 111. The two shafts 116A and 116B, however, are separate from one another so as to permit the cotton stalks to move through the pipes 86. Fixed to the frame 11 is a hydraulic cylinder motor 120 which has its piston 121 provided with a rack 122. The rack drives a pinion gear 125 fixedly mounted upon the shaft 116A. The shaft 116A has fixed thereto a sprocket 130 on which rides a chain 131. The chain 131 meshes with a further sprocket 132 fixedly secured to the shaft 115.

The shaft 115 has a further sprocket 135 fixedly mounted thereon, said sprocket meshing with a chain 136 which also meshes with a sprocket 137 fixedly secured to the shaft 116B. Each of the chains 131 and 136 is connected to a respective one of the guides 110 so that as one of the chains moves upwardly with the vacuum chamber the other chain also moves upwardly an equal distance with the vacuum chamber. Thus, it can be appreciated that the present driving arrangement prevents the vacuum chamber and pipes from becoming canted and always maintains them in the illustrated upright position for proper operation of the present device. As shown in FIG. 5, the guide means 100 has a greater spacing in the pattern of pipes so that the two elements 101 and 102 of the guide means 100 are illustrated in FIG. 5 as out side of the pipes. Each of the elements 101 and 102 is vertically slotted so as to permit vertical movement of the guides 100.

Figure 2:
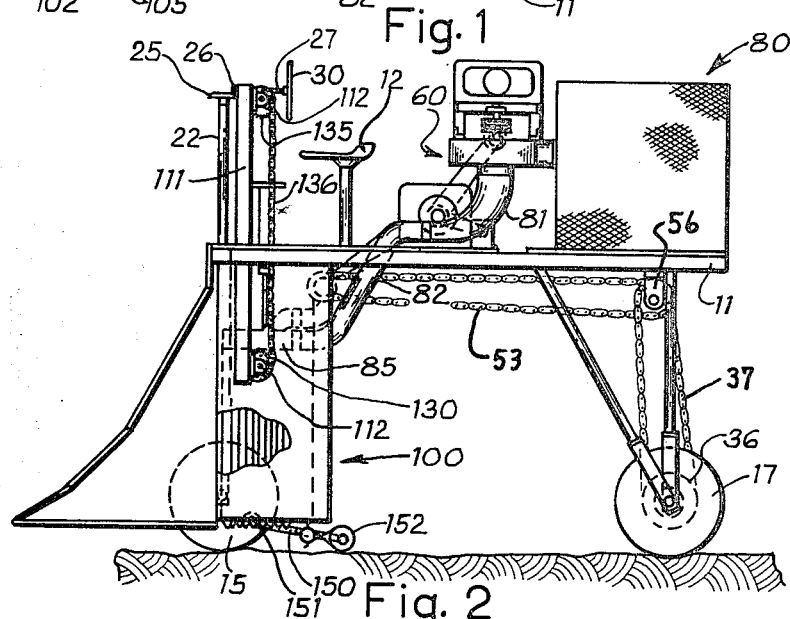
FIG. 2 is a side elevation of the structure of FIG. 1.
Figure 3:
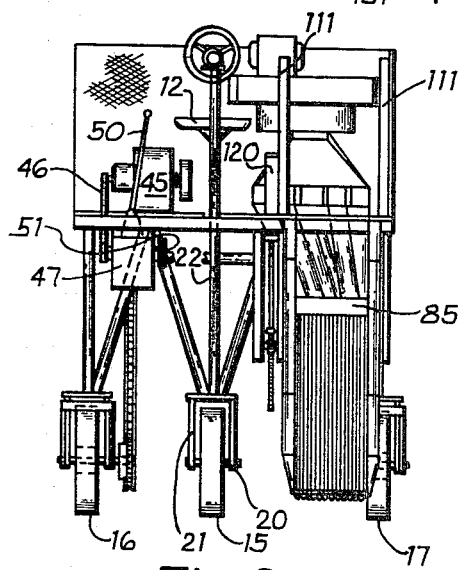
FIG. 3 is a front elevation of the structure of FIG. 1.

Referring now to FIGS. 6 and 7, as well as FIG. 2, there is illustrated a spillage pick up device which includes a carriage 150 swingably mounted at 151 to the guide means 100. The carriage 150 has mounted at its rearward end a roller 152 which rolls across the ground upon which the present device is operating. Rotatably mounted on the carriage 150 is a raking element 155 which includes a plurality of raking fingers 156. As the roller 152 rotates on the ground the rotating rake 155 is caused to rotate in a clockwise direction as viewed in FIG. 7 by means of a resilient cord 160 which surrounds the roller 152 and also surrounds the rotating rake 155 and rides within a suitable groove in each element. The vacuum from the vacuum chamber 85 is conducted downwardly through the closed frame member 165 to a further vacuum chamber 166 through which the fingers 156 of the rotating rake 155 move. It will be noted that vacuum chamber 166 extends horizontally behind the pipes 86 and between the guide means 100. Thus, the vacuum operates to take the accumulated spillage off of the fingers and to move it up the passage 165 to the vacuum chamber 85 for moving into the receptacle 80.

Referring to FIGS. 4 and 5, there is additionally illustrated an upright channel 200 which is fixed to the frame 11 and provides a mount for bearing 201 upon which the shaft 116A is rotatably mounted.

It should also be mentioned that the wheels 15, 16 and 17 as well as certain of the chains and sprockets may be provided with sheet metal guards to protect the operation as well as to protect against cotton stalks becoming caught in the wheels, chains and sprockets.

While the invention has been illustrated and described in detail in the drawings and foregoing description, the same is to be considered as illustrative and not restrictive in character, it being understood that only the preferred embodiment has been shown and described and that all changes and modifications that come within the spirit of the inventiond and the scope of the claims are also desired to be protected.

What is claimed is:

1. Cotton picking apparatus comprising a vehicle, means for moving said vehicle across the ground, a pair of guide elements positioned at the front of the vehicle and adapted to maintain the cotton stalks in a generally upright position therebetween as the vehicle moves through the cotton, a plurality of vertically extending hollow pipes each having a forwardly facing slot therein adjacent to the lower end thereof, means for providing a vacuum in said pipes, each of said plurality being arranged in a pattern through which the cotton stalks move as the vehicle moves across the ground, and means for vertically reciprocating said pipes.

2. The cotton picking apparatus of claim 1 additionally comprising a plurality of air pressure hoses each mounted on a respective one of said pipes and arranged to blow intermittently across the slot on said pipe for removing accumulation adjacent said slot.

3. The cotton picking apparatus of claim 1 additionally comprising a spillage pick up mounted on said vehicle, and including a carriage swingably mounted on said vehicle, a roller rotatably mounted on said carriage and adapted to roll on the ground to support said carriage, a rotatable rake having a plurality of raking fingers and rotatably mounted on said carriage between the swingable mounting of said carriage and said roller, belt means coupling said roller and said rake together whereby rotation of said wheel also rotates said rake, a hollow vacuum-containing chamber mounted on said vehicle adjacent to said rotatable rake, said raking fingers being positioned to move through said vacuum containing chamber as they rotate.

4. The cotton picking apparatus of claim 1 wherein said hollow pipes each have a pointed lower end.

5. The cotton picking apparatus of claim 1 additionally comprising wheels on said vehicle, a seat on said vehicle, and steering means on said vehicle for steering said wheels.

6. The cotton picking apparatus of claim 5 wherein said means for providing a vacuum is a blower, a cotton receptacle coupled to the output of said blower, and hoses leading to the input of said blower and communicating with said pipes.

7. The cotton picking apparatus of claim 6 wherein said means for vertically reciprocating said pipes is a hydraulic cylinder means, said pipes being mounted on a horizontally extending housing, said housing providing communication between said pipes and said hoses.

8. The cotton picking apparatus of claim 7 additionally comprising a plurality of air pressure hoses each mounted on a respective one of said pipes and arranged to blow across the slot on said pipe for removing accumulation adjacent said slot.

9. The cotton picking apparatus of claim 8 additionally comprising a spillage pick up mounted on said vehicle and including a carriage swingably mounted on said vehicle, a roller rotatably mounted on said carriage and adapted to roll on the ground to support said carriage, a rotatable rake having a plurality of raking fingers and rotatably mounted on said carriage between the swingable mounting of said carriage and said roller belt means coupling said roller and said rake together whereby rotation of said wheel also rotates said rake, a hollow vacuum containing chamber mounted on said vehicle adjacent to said rotatable rake, said raking fingers being positioned to move through said vacuum containing chamber as they rotate.

10. The cotton picking apparatus of claim 9 wherein said hollow pipes each have a pointed lower end.

References Cited
UNITED STATES PATENTS

| | | | |
|---|---|---|---|
| 359,724 | 3/1887 | Hanks | 56—30 |
| 1,107,083 | 8/1914 | Lovejoy | 56—30 |
| 1,691,146 | 11/1928 | Boggs | 56—32 |
| 2,292,994 | 8/1942 | Flewellen | 56—30 |
| 2,763,978 | 9/1956 | Graham et al. | 56—30 |
| 2,798,351 | 7/1957 | Altemus | 56—12 |
| 3,332,220 | 7/1967 | Lofgreen | 56—30 |

RUSSELL R. KINSEY, Primary Examiner

U.S. Cl. X.R.

56—30